(12) United States Patent
Toyama et al.

(10) Patent No.: US 10,309,982 B2
(45) Date of Patent: Jun. 4, 2019

(54) MEASUREMENT DEVICE AND MEASUREMENT SYSTEM USING SAME

(71) Applicant: DENSO CORPORATION, Kariya, Aichi-pref. (JP)

(72) Inventors: Tatsuya Toyama, Kariya (JP); Motohiro Kitada, Kariya (JP); Takashi Yasuda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 179 days.

(21) Appl. No.: 15/308,529

(22) PCT Filed: May 18, 2015

(86) PCT No.: PCT/JP2015/002483
§ 371 (c)(1),
(2) Date: Nov. 2, 2016

(87) PCT Pub. No.: WO2015/178006
PCT Pub. Date: Nov. 26, 2015

(65) Prior Publication Data
US 2017/0052206 A1    Feb. 23, 2017

(30) Foreign Application Priority Data

May 23, 2014    (JP) ................. 2014-106983

(51) Int. Cl.
*G01P 5/07*    (2006.01)
*G01P 13/00*    (2006.01)
(Continued)

(52) U.S. Cl.
CPC .................. *G01P 5/07* (2013.01); *G01P 5/10* (2013.01); *G01P 13/0046* (2013.01); *G01P 13/045* (2013.01)

(58) Field of Classification Search
None
See application file for complete search history.

(56) References Cited

U.S. PATENT DOCUMENTS 2,363,087 A * 11/1944 Salisbury ................ G01P 13/02
73/170.03
2,579,344 A * 12/1951 Sias .......................... G01P 5/07
73/170.08
(Continued)

FOREIGN PATENT DOCUMENTS

JP    S57112961 U    7/1982
JP    S58218653 A    12/1983
(Continued)

*Primary Examiner* — Jill E Culler
(74) *Attorney, Agent, or Firm* — Harness, Dickey & Pierce, P.L.C.

(57) ABSTRACT

A measurement device includes a frame member rotatably supported about a first axis line, a detection body disposed inside of the frame member and rotatably supported relative to the frame member about a second axis line, and a vane disposed on one end side of the detection body in a direction orthogonal to the second axis line and that directs the other end side of the detection body in the direction orthogonal to the second axis line toward an air flow upstream side upon receiving an air flow. The measurement device includes a wind direction sensor disposed in the detection body that detects a wind direction as a direction of the other end side of the detection body in the direction orthogonal to the second axis line, and a wind speed sensor disposed in the detection body that detects a wind speed of the air flow.

12 Claims, 8 Drawing Sheets

(51) Int. Cl.
    *G01P 5/10* (2006.01)
    *G01P 13/04* (2006.01)

(56) References Cited

U.S. PATENT DOCUMENTS

| | | | | |
|---|---|---|---|---|
| 3,094,869 A * | 6/1963 | Wehmann | ............... | G01P 5/02 73/170.08 |
| 3,548,654 A * | 12/1970 | Cole, Jr. | ............... | G01P 5/07 73/170.08 |
| 3,977,248 A * | 8/1976 | Metzger | ............... | G01P 5/02 73/861.56 |
| 3,986,396 A * | 10/1976 | Raymond | ............... | G01W 1/04 73/170.07 |
| 4,052,894 A * | 10/1977 | Pinnell | ............... | G01P 5/12 73/170.08 |
| 4,488,431 A * | 12/1984 | Miga | ............... | G01P 13/02 73/170.08 |
| 4,953,402 A * | 9/1990 | Tersiev | ............... | G01P 13/0046 73/170.08 |
| 5,127,358 A * | 7/1992 | Galloway | ............... | G01P 13/02 73/170.05 |
| 2011/0136512 A1 * | 6/2011 | Ohkubo | ............... | G01P 13/045 701/500 |

FOREIGN PATENT DOCUMENTS

| | | | |
|---|---|---|---|
| JP | H04332867 A | 11/1992 | |
| JP | 3013410 U | 7/1995 | |
| JP | 2011002315 A | 1/2011 | |
| JP | 2011256005 A | 12/2011 | |
| JP | 3189250 U | 3/2014 | |

* cited by examiner

MEASUREMENT DEVICE AND MEASUREMENT SYSTEM USING SAME

CROSS-REFERENCE TO RELATED APPLICATIONS

This application is a U.S. National Phase Application under 35 U.S.C. 371 of International Application No. PCT/JP2015/002483 filed on May 18, 2015 and published in Japanese as WO 2015/178006 A1 on Nov. 26, 2015. This application is based on and claims the benefit of priority from Japanese patent application No. 2014-106983 filed on May 23, 2014. The entire disclosures of all of the above applications are incorporated herein by reference.

TECHNICAL FIELD

The present disclosure relates to a measurement device and a measurement system using the same.

BACKGROUND

In recent years, in order to improve an exhaust gas purification performance of a motor vehicle driving engine, the driving engine is being changed from an engine of a type providing an exhaust port of an exhaust gas in front of the vehicle to an engine of a type providing the exhaust port of the exhaust gas at the rear of the vehicle. For that reason, a heat is exhausted from an exhaust pipe of the engine at the rear side of the engine in an engine room in the vehicle direction, and the exhaust gas may cause a trouble to occur in equipment in the engine room. As a countermeasure, there is a desire to improve an air flow in the engine room, and improve a cooling performance in the engine room.

Up to now, there is a hot-wire anemometer using a hot wire (for example, refer to Patent Literature 1).

PRIOR ART LITERATURE

Patent Literature

Patent Literature 1: JP H4-332867 A

SUMMARY OF THE INVENTION

Under the circumstance, in order to analyze the air flow in the engine room in which the engine of the type providing the exhaust port of the exhaust gas at the rear of the vehicle is disposed, the present inventors have investigated a measurement device for measuring a wind speed and a wind direction in the engine room in a state where a trunk lid of an engine compartment of the motor vehicle is closed.

For example, in the hot-wire anemometer of Patent Literature 1, the wind direction cannot be measured though the wind speed is measured. For that reason, a method of measuring the wind speed in each orientation with the use of the hot-wire anemometer while changing a direction of the anemometer is conceivable. However, this makes it necessary to open and close a trunk lid (engine hood) of the motor vehicle every time the direction of the hot-wire anemometer is changed. Therefore, it takes a time to measure the wind speed and the wind direction, resulting in a possibility that the wind speed and the wind direction cannot be efficiently measured.

In view of the above difficulties, the present disclosure aims at providing a measurement device that is capable of efficiently measuring a wind speed and a wind direction, and a measurement system using the measurement device.

According to a first aspect of the present disclosure, a measurement device comprises a frame member supported to be rotatable about a first axis line extending in a first direction, a detector including a detection body disposed inside of the frame member and supported to be rotatable relative to the frame member about a second axis line extending in a second direction orthogonal to the first direction, and a vane disposed on one end side of the detection body in a direction orthogonal to the second axis line, the vane receiving an air flow to rotate the frame member and the detection body, thereby directing an other end side of the detection body in the direction orthogonal to the second axis line toward an air flow upstream side, a wind direction sensor disposed in the detection body, the wind direction sensor detecting a wind direction as a direction toward which the other end side of the detection body in the direction orthogonal to the second axis line faces, and a wind speed sensor disposed in the detection body, the wind speed sensor detecting a wind speed of the air flow.

According to the first aspect of the present disclosure, the wind speed and the wind direction can be detected without changing the direction of the measurement device. Therefore, the measurement device capable of efficiently measuring the wind speed and the wind direction can be provided.

According to a second aspect of the present disclosure, the wind direction detected by the wind direction sensor and the wind speed detected by the wind speed sensor are displayed in the measurement device based on the output signal of the wind direction sensor and the output signal of the wind speed sensor of the measurement device.

Therefore, according to the second aspect of the present disclosure, the measurement system capable of efficiently measuring the wind speed and the wind direction can be provided.

EMBODIMENTS FOR CARRYING OUT INVENTION

Hereinafter, embodiments of the present disclosure will be described below with reference to the drawings. In the respective embodiments to be described below, for the purpose of simplifying the description, the same reference signs will be assigned to the like or the equivalent portions in the drawings.

First Embodiment

FIGS. 1 to 8 illustrate a measurement device 1 according to a first embodiment of the present disclosure. The measurement device 1 according to the present embodiment is configured by a sensor for measuring a wind speed and a wind direction within an engine room (space to be measured) of a motor vehicle, and as illustrated in FIGS. 1 to 4, includes a support member 10, a frame member 20, and a detector 30.

Figure 2:
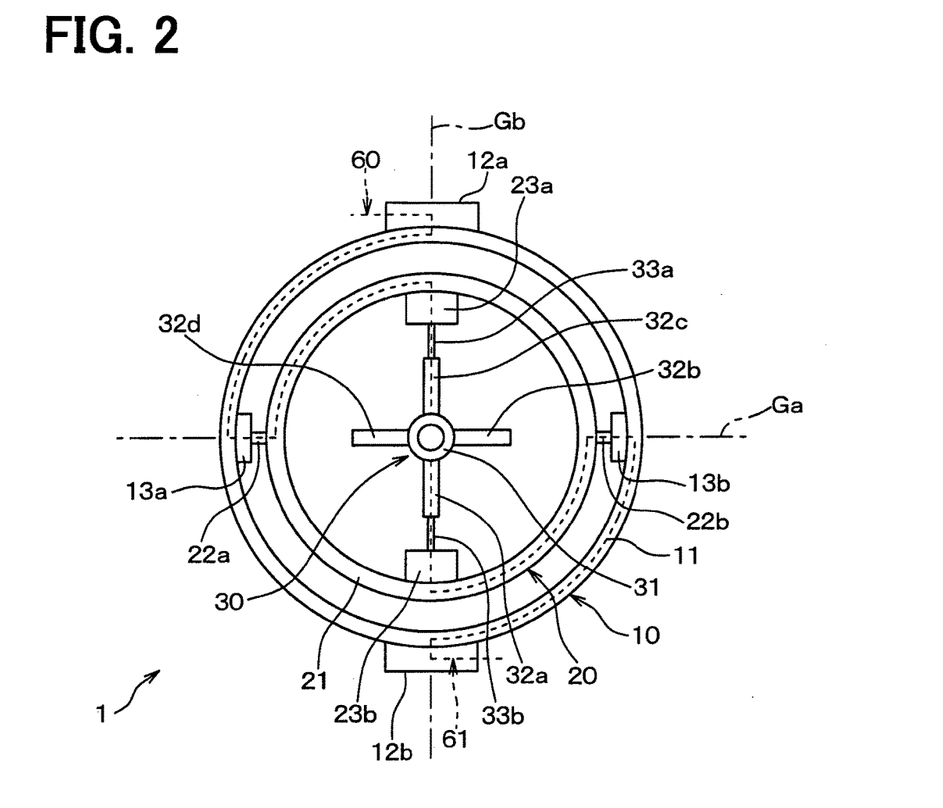
FIG. 2 is a front view of the measurement device according to the first embodiment.
Figure 3:
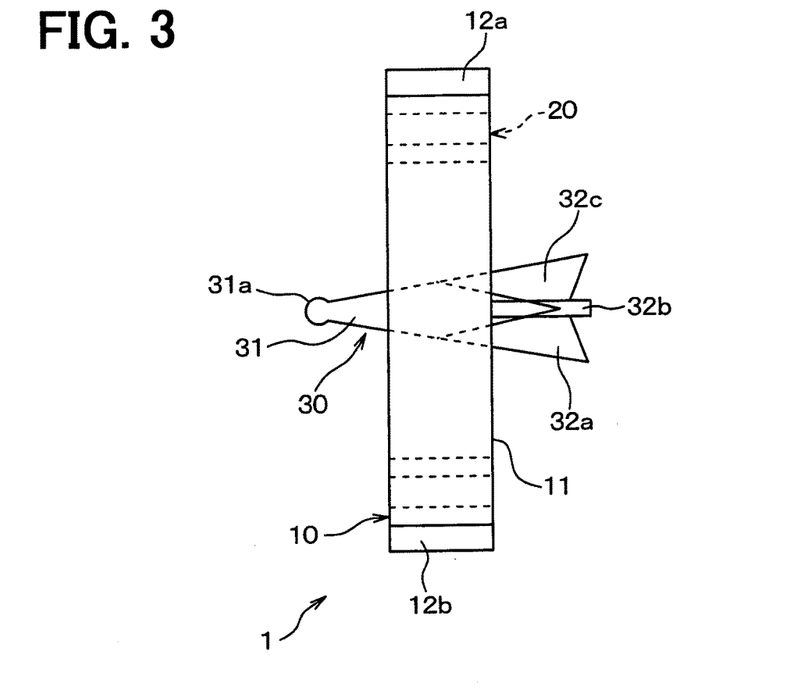
FIG. 3 is a right side view of the measurement device according to the first embodiment.
Figure 4:
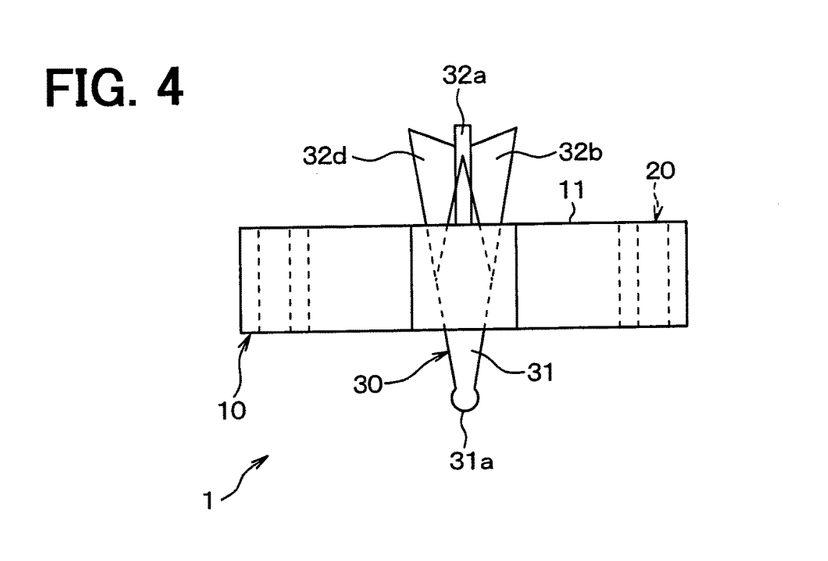
FIG. 4 is a top view of the measurement device according to the first embodiment.

As illustrated in FIG. 2, the support member 10 is a frame including an outer frame member 11, protrusions 12a, 12b, and outer bearings 13a, 13b. The outer frame member 11 is formed into a toric shape, and disposed in an upright state within the engine room. The protrusion 12a is formed to protrude upward from an upper side of an outer peripheral surface of the outer frame member 11. The protrusion 12b is formed to protrude downward from a lower side of the outer peripheral surface of the outer frame member 11. The protrusion 12a exposes an end side of a wiring portion 60 (chain line in FIG. 2) of a wind direction sensor 40 to be described later. The protrusion 12b exposes an end side of a wiring portion 61 (chain line in FIG. 2) of a wind speed sensor 50 to be described later.

The outer bearing 13a is formed to protrude rightward from a left side of an inner peripheral surface of the outer frame member 11. The outer bearing 13b is formed to protrude leftward from a right side of the inner peripheral surface of the outer frame member 11. The outer bearings 13a and 13b rotatably support outer rotating shafts (second rotating shafts) 22a and 22b of the frame member 20. A specific structure of the outer bearings (second bearings) 13a and 13b will be described later.

The frame member 20 is configured by a rotary frame that is disposed inside of the support member 10, and includes an inner frame member 21, the outer rotating shafts 22a, 22b, and inner bearings 23a, 23b. The inner frame member 21 is formed into a toric shape.

The outer rotating shaft 22a is formed to protrude leftward from a left side of an outer peripheral surface of the inner frame member 21. The outer rotating shaft 22b is formed to protrude rightward from a right side of the outer peripheral surface of the inner frame member 21. The outer rotating shafts 22a and 22b are formed to extend in a first direction (horizontal direction in FIG. 2). With the above configuration, the frame member 20 is supported to be rotatable about an axis line Ga (first axis line) extending in the first direction by the outer bearings 13a and 13b of the support member 10. The axis line Ga represents an axis line of the outer rotating shafts 22a and 22b.

The inner bearing 23a is formed to protrude downward from an upper side of an inner peripheral surface of the inner frame member 21. The inner bearing 23b is formed to protrude upward from a lower side of the inner peripheral surface of the inner frame member 21. The inner bearings 23a and 23b rotatably support inner rotating shafts (first rotating shafts) 33a and 33b of the detector 30. A specific structure of the inner bearings (first bearings) 23a and 23b will be described later.

The detector 30 is disposed inside of the frame member 20, and includes a detection body 31, vanes 32a, 32b, 32c, 32d, and the inner rotating shafts 33a, 33b. The detection body 31 is formed to extend in a direction (orthogonal direction to a paper plane in FIG. 2) orthogonal to the axis line Ga (that is, first direction). The vanes 32a, 32b, 32c, and 32d are disposed on one end side of the detection body 31 in the orthogonal direction (right side in FIG. 3).

In other words, the vanes 32a, 32b, 32c, and 32d are disposed on one end side (that is, rearward) of the detector 30 in the orthogonal direction with respect to a mass center of gravity. In the present embodiment, when the detector 30, the wind direction sensor 40, and the wind speed sensor 50 are regarded as one body, the mass center of gravity represents the mass center of gravity of one body.

With the above configuration, an aerodynamic center (power point) of the detector 30 for receiving the aerodynamic is set to one end side (that is, rearward) of the detector 30 in the orthogonal direction with respect to the mass center of gravity. For that reason, upon receiving the air flow (that is, air resistance), the vanes 32a to 32d perform a function of rotating the detector 30 and the frame member 20, and following a posture of the detector 30 in an air flow direction.

In the present embodiment, the other end side 31a of the detection body 31 in the orthogonal direction is formed into a spherical shape. The detection body 31 is formed to be gradually smaller in a cross-sectional area from the mass center of gravity toward the other end side 31a (distal end side) in the orthogonal direction. The detection body 31 is formed to be gradually smaller in a cross-sectional area from the mass center of gravity toward one end side (that is, rearward) in the orthogonal direction. With the above configuration, the detection body 31 makes it difficult to generate eddy and turbulent caused by the air flow.

The inner rotating shaft 33a is formed to extend from the detection body 31 to one side (upper side in FIG. 2) in the second direction. The inner rotating shaft 33b is formed to extend from the detection body 31 to the other side (lower side in FIG. 2) in the second direction. With the above configuration, the detector 30 is supported to be rotatable about the axis line Gb (second axis line) by the inner bearings 23a and 23b of the frame member 20. The orthogonal direction represents an orthogonal direction to the axis line Gb.

In the present embodiment, the inner rotating shafts 33a and 33b are disposed so that the axis lines of those inner rotating shafts 33a, 33b overlap with the mass center of gravity of the detector 30. The second direction represents a direction along which the axis line Gb of the inner rotating shafts 33a and 33b extend. The axis line Gb is orthogonal to the axis line Ga (that is, first direction) of the outer rotating shafts 22a and 22b. In the present embodiment, the first direction that is the axial directions of the outer rotating shafts 22a and 22b is set to a horizontal direction.

Figure 5:
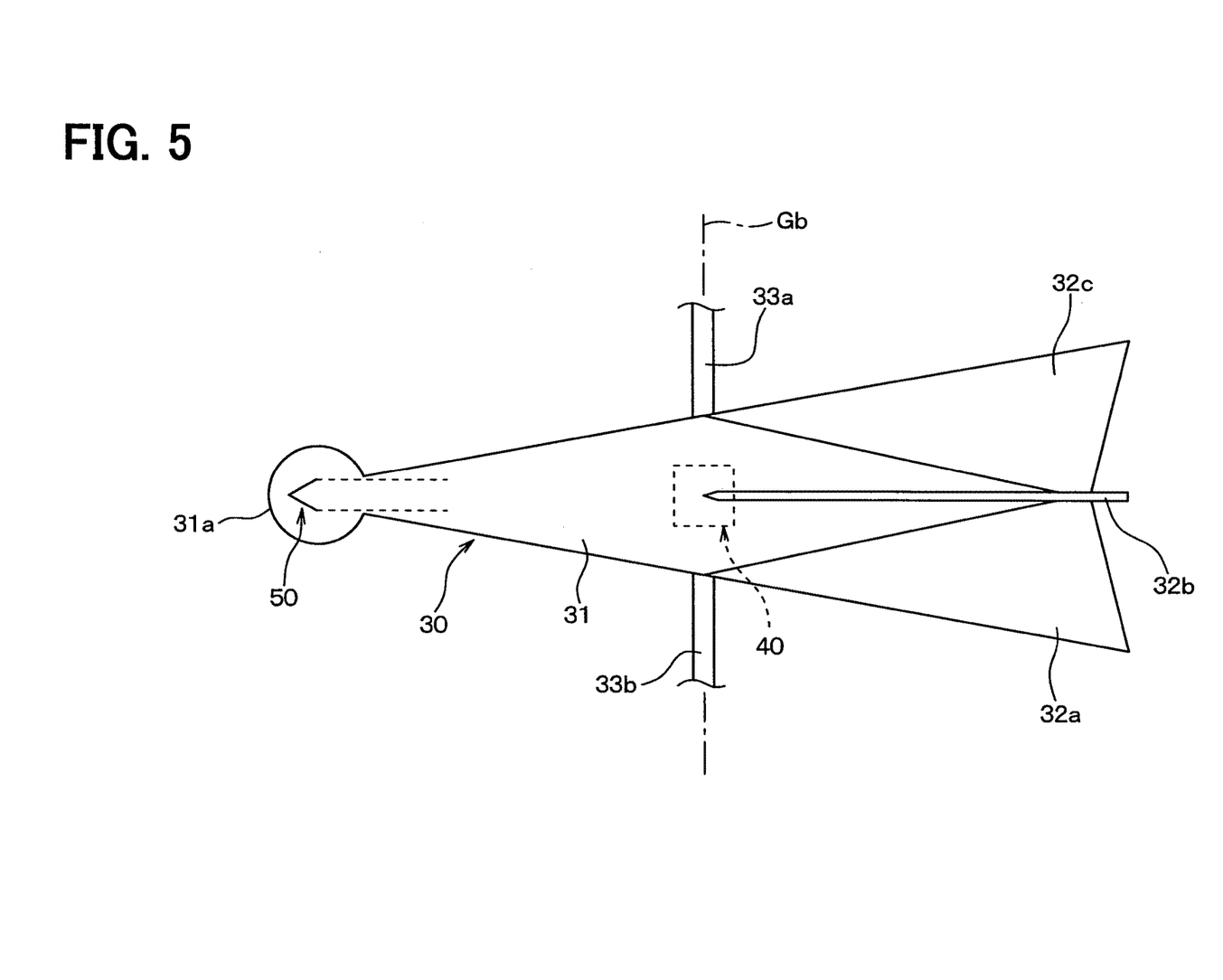
FIG. 5 is a diagram illustrating a single body of a detector in FIG. 1.

As illustrated in FIG. 5, the detector 30 includes the wind direction sensor 40 and the wind speed sensor 50.

Figure 6:
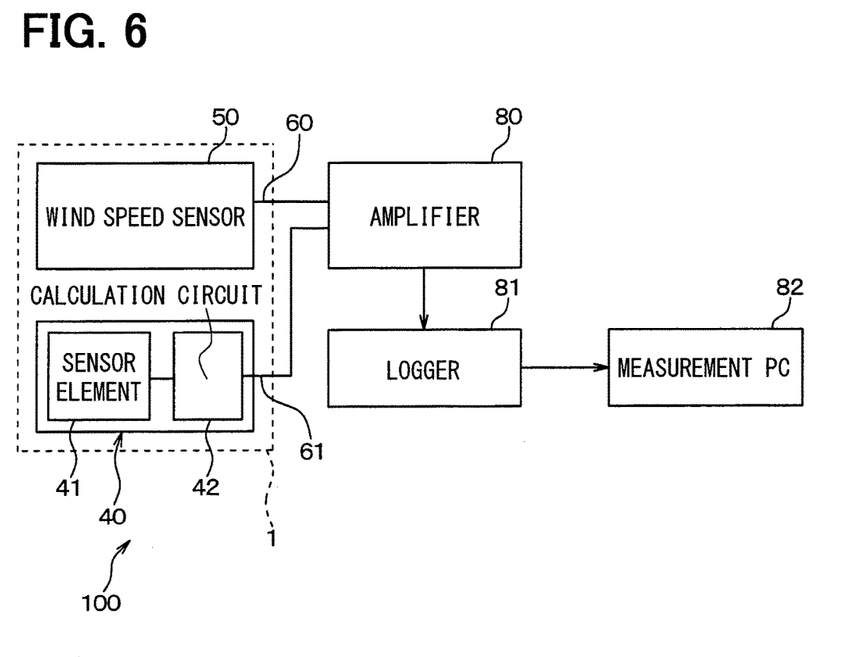
FIG. 6 is a diagram illustrating an overall configuration of a measurement system employing the measurement device according to the first embodiment.

As will be described later, the wind direction sensor 40 represents a sensor for detecting the wind direction of the air flow flowing around the detector 30, and as illustrated in FIG. 6, includes a sensor element 41 and a calculation circuit 42. The sensor element 41 represents a gyro sensor for detecting an angular velocity of the frame member 20 centered on the axis line Ga, and an angular velocity of the detection body 31 centered on the axis line Gb.

The calculation circuit 42 integrates the angular velocity centered on the axis line Ga which is detected by the sensor element 41 over time to calculate the rotation angle of the frame member 20 centered on the axis line Ga. The calculation circuit 42 also integrates the angular velocity centered on the axis line Gb detected by the sensor element 41 over time to calculate the rotation angle of the detection body 31 centered on the axis line Gb. The calculation circuit 42 obtains the wind direction of the air flow according to the calculated rotation angle of the frame member 20 and the calculated rotation angle of the detection body 31. The wind direction sensor 40 according to the present embodiment is embedded in the mass center of gravity side of the detector 30.

The wind speed sensor 50 is configured by a known hot-wire wind speed sensor that is disposed on the other end side (distal end side) of the detection body 31 in the orthogonal direction, and detects the wind speed of the air flow flowing around the detector 30. The wind speed sensor 50 according to the present embodiment is embedded on the other end side of the detection body 31 in the orthogonal direction.

In the present embodiment, multiple wiring portions 60 for propagating the output signal of the wind direction sensor 40 are disposed. The wiring portions 60 are formed of electric cables. The wiring portions 60 penetrate through the inner rotating shaft 33a, the inner bearing 23a, the frame member 20, the outer rotating shaft 22a, the outer bearing 13a, and the support member 10 between the wind direction sensor 40 and the protrusion 12a. That is, the wiring portions 60 are embedded in the inner rotating shaft 33a, the inner bearing 23a, the frame member 20, the outer rotating shaft 22a, the outer bearing 13a, the support member 10, and the protrusion 12a.

In this example, one end side of the wiring portions 60 is connected to the wind direction sensor 40. The other end side of the wiring portions 60 is exposed from the protrusion 12a and connected to an amplifier 80 (refer to FIG. 6).

Multiple wiring portions 61 for propagating the output signal of the wind speed sensor 50 are disposed. The wiring portions 61 are formed of electric cables. The wiring portions 61 penetrate through the inner rotating shaft 33b, the inner bearing 23b, the frame member 20, the outer rotating shaft 22b, the outer bearing 13b, and the support member 10 between the wind speed sensor 50 and the protrusion 12b. That is, the wiring portions 61 are embedded in the inner rotating shaft 33b, the inner bearing 23b, the frame member 20, the outer rotating shaft 22b, the outer bearing 13b, the support member 10, and the protrusion 12b.

In this example, one end side of the wiring portions 61 is connected to the wind speed sensor 50. The other end side of the wiring portions 60 is exposed from the protrusion 12b and connected to an amplifier 80 (refer to FIG. 6).

Meanwhile, the support member 10, the frame member 20, and the detector 30 according to the present embodiment can be made of a resin material or a metal material.

Figure 7:
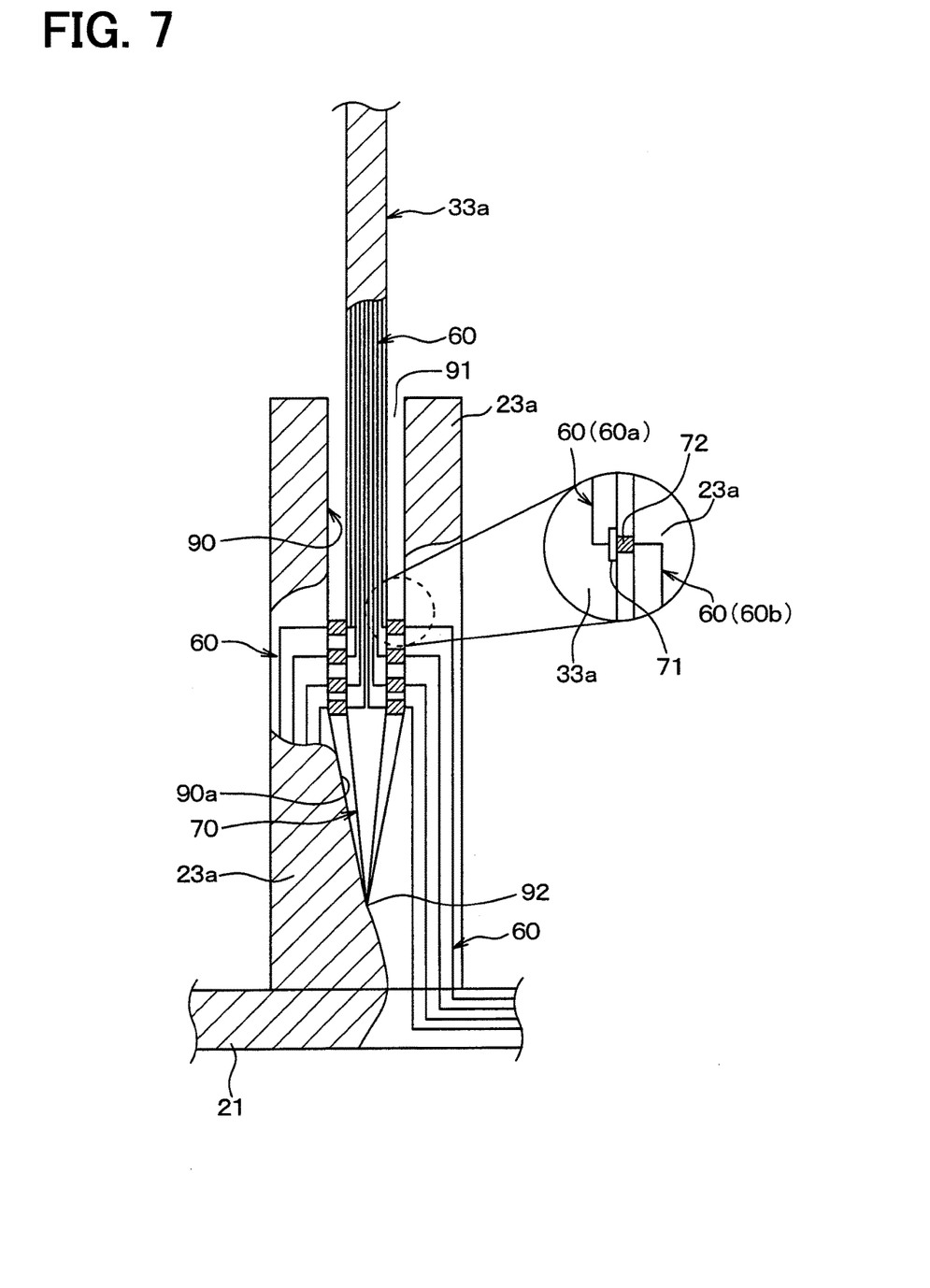
FIG. 7 is a half cross-sectional view of a rotating shaft and a bearing of the detector in FIG. 1.

Next, a structure of the inner rotating shaft 33a and the inner bearing 23a according to the present embodiment will be described with reference to FIG. 7. FIG. 7 is a partially enlarged view of the inner rotating shaft 33a and the inner bearing 23a.

The inner rotating shaft 33a includes a needle portion 70 that becomes smaller in an area of a cross-section orthogonal to the direction of the axis line Gb from one end side toward the other end side in the direction of the axis line Gb. The inner bearing 23a includes a hole portion 90 that houses the needle portion 70 and rotatably supports the needle portion 70. The other end side of the needle portion 70 of the inner rotating shaft 33a in the direction of the axis line Gb is located on a bottom 92 side of the hole portion 90. A tapered portion 90a is formed on the other end side of the hole portion 90 in the direction of the axis line Gb. The tapered portion 90a is formed into an inverted conical shape whose opening area becomes smaller toward the bottom 92 side from an opening portion 91 side of the tapered portion 90a. The tapered portion 90a rotatably supports the needle portion 70.

In this example, as illustrated in FIG. 7, multiple electrodes (first electrode portions) 71 are disposed on an outer peripheral side of the inner rotating shaft 33a. The multiple electrodes 71 are disposed on one end side of the inner rotating shaft 33a in the direction of the axis line Gb with respect to the needle portion 70. The multiple electrodes 71 are each connected to a portion 60a of the wiring portion 60 which is incorporated in the inner rotating shaft 33a for each of the wiring portions 60. The multiple electrodes 71 are each formed into a ring shape centered on the axis line of the inner rotating shaft 33a. FIG. 7 illustrates eight of the multiple electrodes 71 and eight of the wiring portions 60.

Multiple brushes (second electrode portions) 72 are disposed in the hole portion 90 of the inner bearing 23a. The multiple brushes 72 are each connected to a portion 60b of the wiring portion 60 which is incorporated into the inner bearing 23a for each of the wiring portions 60. The multiple brushes 72 are supported by the inner bearing 23a. The multiple brushes 72 are each configured by an electrode that slides on a corresponding electrode 71 of the multiple electrodes 71 with the rotation of the inner rotating shaft 33a.

With the above configuration, in a state where the inner rotating shaft 33a rotates, the portion 60a of each wiring portion 60 which is disposed in the inner rotating shaft 33a is brought into contact with the portion 60b of each wiring portion 60 which is disposed in the inner bearing 23a through the corresponding electrode 71 and the corresponding brush 72.

In this example, the inner rotating shaft 33b is configured in the same manner as that of the inner rotating shaft 33a. The inner bearing 23b is configured in the same manner as that of the inner bearing 23a. With the above configuration, in the state where the inner rotating shaft 33b rotates, the portion of each wiring portions 61 which is disposed in the inner rotating shaft 33b is brought into contact with the portion of each wiring portion 61 which is disposed in the inner bearing 23b through the corresponding electrode 71 and the corresponding brush 72.

The outer rotating shaft 22a is configured in the same manner as that of the inner rotating shaft 33a. The outer bearing 13a is configured in the same manner as that of the inner bearing 23a. With the above configuration, in a state where the outer rotating shaft 22a rotates, the portion of each wiring portion 60 which is disposed in the outer rotating shaft 22a is brought into contact with the portion of each wiring portion 60 which is disposed in the outer bearing 13a through the corresponding electrode (third electrode portion) and the corresponding brush (fourth electrode portion). Meanwhile, the electrodes disposed on the outer rotating shaft 22a and the brushes disposed in the outer bearing 13a are the same as the electrodes 71 disposed on the inner rotating shaft 33b and the brushes 72 disposed in the inner bearing 23a illustrated in FIG. 7, respectively, and therefore their illustrations are omitted.

The outer rotating shaft 22b is configured in the same manner as that of the inner rotating shaft 33a. The outer bearing 13b is configured in the same manner as that of the inner bearing 23a. With the above configuration, in the state where the outer rotating shaft 22b rotates, the portion of each wiring portion 61 which is disposed in the outer rotating shaft 22b is brought into contact with the portion of each wiring portion 61 which is disposed in the outer bearing 13b through the corresponding electrode 71 and the corresponding brush 72.

Subsequently, the operation of the measurement device 1 according to the present embodiment will be described.

Figure 1:
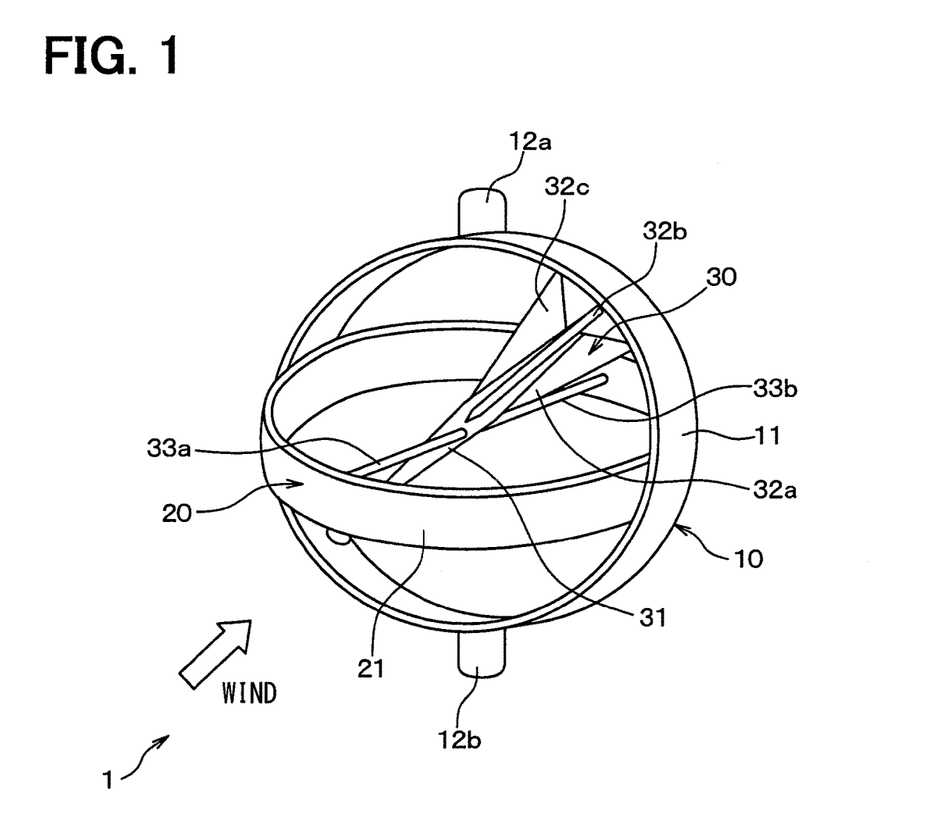
FIG. 1 is a perspective view of a measurement device according to a first embodiment of the present disclosure.
Figure 8:
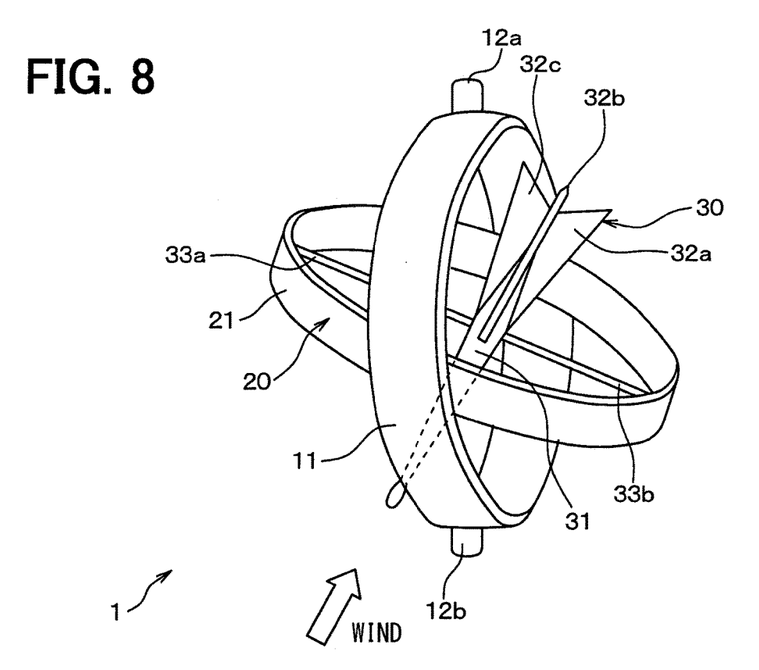
FIG. 8 is a perspective view of the measurement device according to the first embodiment.

First, in the detector 30, the vanes 32a to 32d give a driving force to the detection body 31 upon receiving the air flow (that is, air resistance) flowing around the detection body 31. By the aid of the driving force, the detection body 31 rotates about the axis line Gb relative to the frame member 20. Further, the driving force given to the detection body 31 from the vanes 32a to 32d due to the air flow is given to the frame member 20. For that reason, the frame member 20 rotates about the axis line Ga relative to the support member 10. With the above configuration, upon receiving the air resistance, the vanes 32a, 32b, 32c and 32d rotate the detector 30 and the frame member 20, and follow a posture of the detector 30 in the air flow. In other words, the detector 30 functions as a so-called "weathercock". Therefore, the other end side 31a of the detection body 31 in the orthogonal direction (that is, distal end side) is directed toward the air flow upstream side. (refer to FIGS. 1 and 8). FIGS. 1 and 8 illustrate states in which the other end side 31a of the detection body 31 is directed to the different orientations depending on the wind direction in the detector 30.

In the wind direction sensor 40, the sensor element 41 detects an angular velocity of the frame member 20 centered on the axis line Ga, and an angular velocity of the detection body 31 centered on the axis line Gb. The calculation circuit 42 integrates the angular velocity centered on the axis line Ga which is detected by the sensor element 41 over time to calculate the rotation angle of the frame member 20 centered on the axis line Ga. The calculation circuit 42 also integrates the angular velocity centered on the axis line Gb detected by the sensor element 41 over time to calculate the rotation angle of the detector 30 centered on the axis line Gb.

Then, the calculation circuit 42 obtains the wind direction of the air flow indicative of the posture of the detector 30 according to the calculated rotation angle of the frame member 20 and the calculated rotation angle of the detector 30. A detection signal indicative of the obtained wind direction is propagated through the multiple wiring portions 60 and output to the outside of the measurement device 1. The wind speed sensor 50 detects the wind speed of the air flow flowing around the detector 30. A detection signal indicative of the detected wind speed is propagated on the multiple wiring portions 61 and output to the outside of the measurement device 1.

Subsequently, a measurement system 100 employing the measurement device 1 according to the present embodiment will be described.

The measurement system 100 according to the present embodiment includes the measurement device 1, the amplifier 80, a logger 81, and a measurement PC 82.

The amplifier 80 amplifies the detection signal output from the wind direction sensor 40 through the multiple wiring portions 60 and outputs the amplified signal. The amplifier 80 amplifies the detection signal output from the wind speed sensor 50 through the multiple wiring portions 61 and outputs the amplified signal.

The logger 81 stores measurement data of the wind direction sensor 40 and measurement data of the wind speed sensor 50 based on the output signals of the amplifier 80.

The measurement data of the wind direction sensor 40 is indicative of the wind direction detected by the wind direction sensor 40. The measurement data of the wind speed sensor 50 is indicative of the wind speed detected by the wind speed sensor 50.

The measurement PC 82 configures the display control device according to the present disclosure, which is a known computer including a display device and a control unit that controls the display device. The measurement PC 82 stereoscopically displays the measurement data of the wind direction sensor 40 and the measurement data of the wind speed sensor 50, which are stored in the logger 81, on the display device.

For example, in the display device, an image showing the interior of the engine room to be measured is stereoscopically displayed, and arrows as the measurement data are superimposed on the image and displayed. The display of the arrows indicates the measurement data of the wind direction sensor 40 and the measurement data of the wind speed sensor 50.

In this example, an orientation of the arrow indicates the wind direction (that is, the air flow upstream side). The size of the arrow and the thickness of the arrow indicate the wind speed as the measurement data of the wind speed sensor 50. For that reason, the arrow becomes larger or the arrow becomes thicker as the wind speed is higher.

According to the present embodiment described above, the measurement device 1 includes the frame member 20 that is supported to be rotatable about the axis line Ga extending in the first direction, and the detection body 31 that is disposed inside of the frame member 20 and supported to be rotatable relative to the frame member 20 about the axis line Gb extending in the second direction orthogonal to the first direction. The measurement device 1 includes the vanes 32a, 32b, 32c, and 32d that are disposed on one end side of the detection body 31 in the orthogonal direction to the axis line Gb, rotate the frame member 20 and the detection body 31 upon receiving the air flow, and direct the other end side of the detection body 31 in the direction orthogonal to the axis line Gb toward the air flow upstream side. The measurement device 1 includes the wind direction sensor 40 that is disposed in the detection body 31 and detects the wind direction as the direction of the other end side of the detection body 31 in the direction orthogonal to the second axis line, and the wind speed sensor 50 that is disposed in the detection body 31 and detects the wind speed of the air flow. Therefore, the measurement device 1 that automatically detects the wind speed and the wind direction, and the measurement system 100 using the measurement device can be provided.

In the present embodiment, each of the outer rotating shafts 22a, 22b and the inner rotating shafts 33a, 33b includes the needle portion 70. The tapered portion 90a formed into the inverse conical shape is disposed in each of the outer bearings 13a, 13b and the inner bearings 23a, 23b. The outer bearings 13a, 13b and the inner bearings 23a, 23b rotatably support the outer rotating shafts 22a, 22b and the inner rotating shafts 33a, 33b, respectively, by the tapered portion 90a. For that reason, sliding resistances can be reduced between the outer rotating shafts 22a, 22b and the inner rotating shafts 33a, 33b, and between the outer bearings 13a, 13b and the inner bearings 23a, 23b.

Second Embodiment

In the first embodiment, the example in which the wiring portions 60 and 61 are used to propagate the output signal of the wind direction sensor 40 and the output signal of the wind speed sensor 50 to the amplifier 80 has been described.

Instead, in a second embodiment, an example in which an output signal of a wind direction sensor 40 and an output signal of a wind speed sensor 50 are propagated to an amplifier 80 through a wireless communication will be described.

Figure 9:
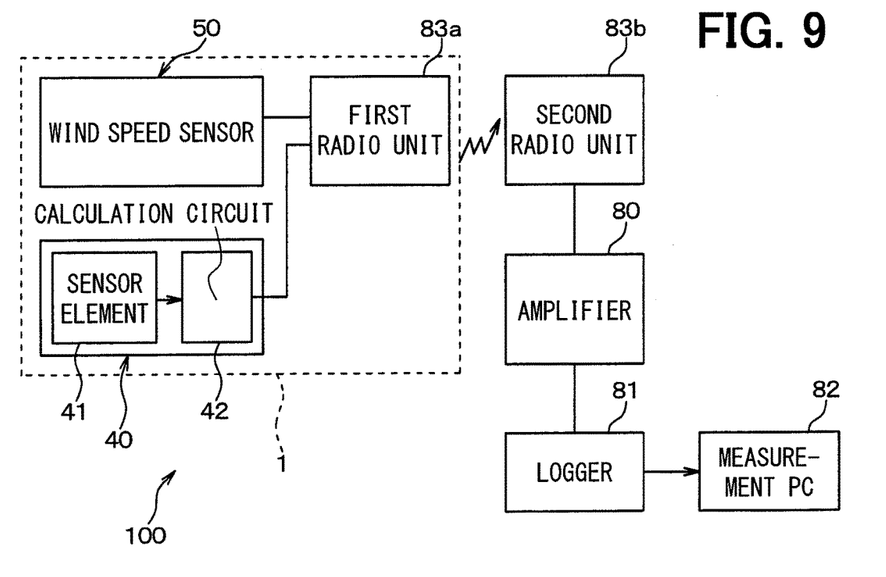
FIG. 9 is a diagram illustrating an overall configuration of a measurement system according to a second embodiment of the present disclosure.
Figure 10:
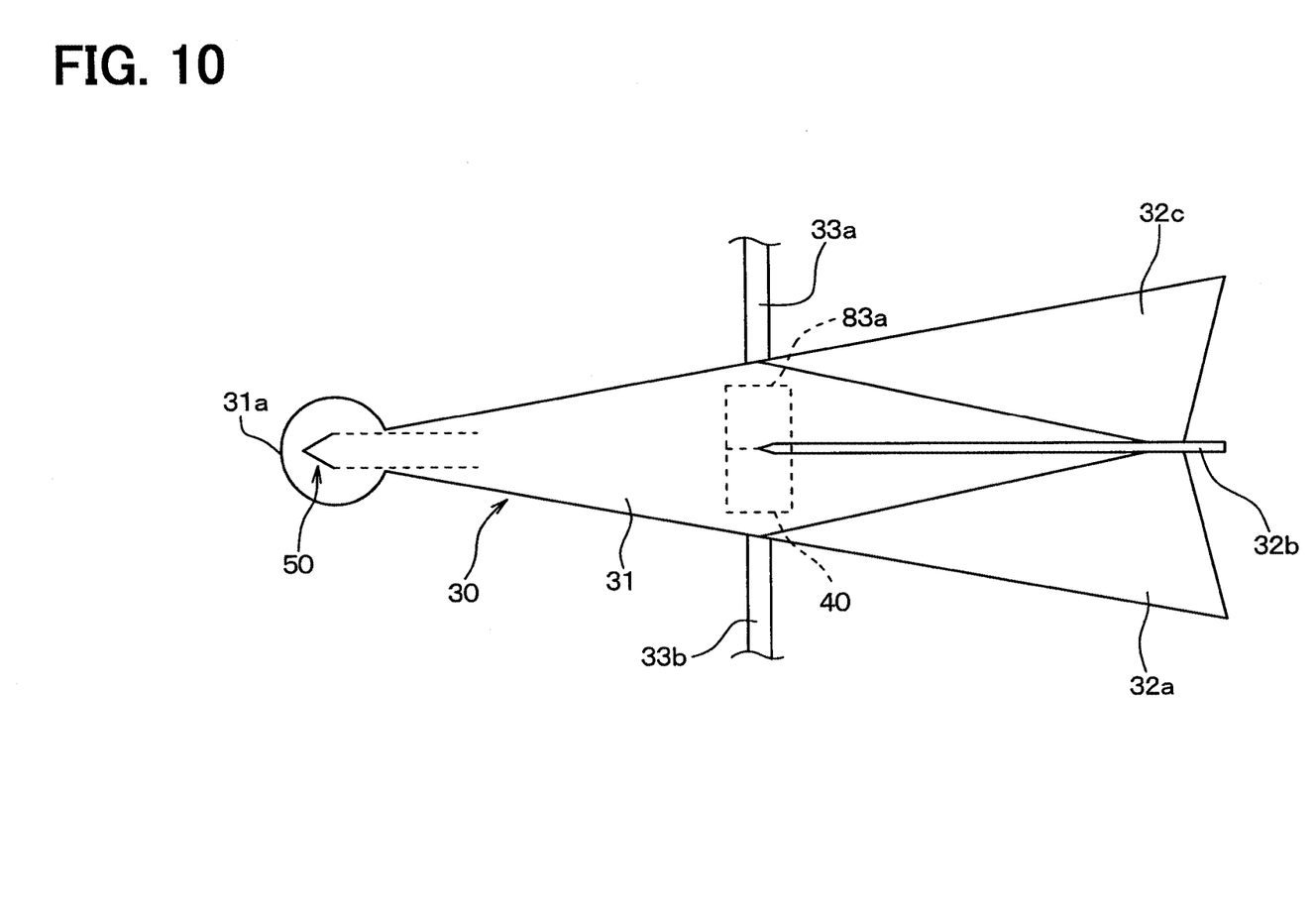
FIG. 10 is a diagram illustrating a single body of a detector in a measurement device according to the second embodiment.

FIG. 9 illustrates an overall configuration of a measurement system 100 according to the present embodiment of the present disclosure. FIG. 10 illustrates a single body of a detector 30 in a measurement device 1 according to the present embodiment. A first radio unit 83a is provided in the detector 30 of the measurement device 1 according to the present embodiment. A second radio unit 83b is disposed independently of the measurement device 1. The second radio unit 83b wirelessly communicates with the first radio unit 83a.

In the present embodiment, as in the above first embodiment, the inner rotating shafts 33a and 33b are disposed so that the axis lines of those inner rotating shafts 33a, 33b overlap with the mass center of gravity of the detector 30. However, when the detector 30, the wind direction sensor 40, the wind speed sensor 50, and the first radio unit 83a are regarded as one body, the above mass center of gravity represents the mass center of gravity of one body. The vanes 32a, 32b, 32c, and 32d are disposed on one end side (that is, rearward) of the detector 30 in the orthogonal direction with respect to a mass center of gravity.

In the measurement system 100 according to the present embodiment configured as described above, the first radio unit 83a transmits a transmission signal including the output signal from the wind direction sensor 40 and the output signal from the wind speed sensor 50 with radio waves as a medium. The second radio unit 83b receives the signal transmitted from the first radio unit 83a. The received signal is amplified by the amplifier 80 and output to the logger 81. For that reason, the logger 81 stores measurement data of the wind direction sensor 40 and measurement data of the wind speed sensor 50 based on the output signals of the amplifier 80. As in the above first embodiment, the measurement PC 82 stereoscopically displays the measurement data of the wind direction sensor 40 and the measurement data of the wind speed sensor 50, which are stored in the logger 81, on the display device.

Other Embodiments

In the above first and second embodiments, the example in which the calculation circuit 42 of the wind direction sensor 40 is provided in the measurement device 1 has been described. Instead, the calculation circuit 42 may be provided independently of the measurement device 1. In that case, the output signal of the sensor element 41 of the wind direction sensor 40 is propagated to the amplifier 80 side through the wiring portions 60. The calculation circuit 42 obtains the wind direction based on the output signal of the sensor element 41 amplified by the amplifier 80.

In the above first and second embodiments, the example in which the inner rotating shafts 33a and 33b are provided in the detection body 31, and the inner bearings 23a and 23b are provided in the frame member 20 has been described. Instead, the inner rotating shafts 33a and 33b may be provided in the frame member 20, and the inner bearings 23a and 23b may be provided in the detection body 31.

In the above first and second embodiments, the example in which the outer bearings 13a and 13b are provided in the support member 10, and the outer rotating shafts 22a and 22b are provided in the frame member 20 has been described. Instead, the outer bearings 13a and 13b may be provided in the frame member 20, and the outer rotating shafts 22a and 22b may be provided in the support member 10.

In the above first and second embodiments, the example in which the measurement device 1 of the present disclosure is used to measure the wind speed and the wind direction in the engine room of the motor vehicle has been described. Alternatively, the measurement device 1 according to the present disclosure may be used to measure the wind speed and the wind direction of an object to be measured except for the motor vehicle.

In the above first and second embodiments, the example in which the outer frame member 11 of the support member 10 is formed into the toric shape has been described. However, the present disclosure is not limited to the above configuration, and the outer frame member 11 of the support member 10 may be formed into any annular shape other than the toric shape.

Likewise, the frame member 20 may be formed into any annular shape other than the toric shape.

In the implementation of the present disclosure, a spherical portion is formed on the distal end portion of each needle portion 70 of the outer rotating shafts 22a, 22b and the inner rotating shafts 33a, 33b of the above first and second embodiments, and a spherical hole portion that rotatably supports the spherical portion of the needle portion 70 may be provided in each of the outer bearings 13a, 13b and the inner bearings 23a, 23b.

In the above first and second embodiments, the example in which the hot-wire wind speed sensor is used as the wind speed sensor 50 has been described. Alternatively, various types of wind speed sensors other than the hot-wire wind speed sensor may be used as the wind speed sensor 50.

In the above first and second embodiments, the example in which the wind speed sensor 50 is disposed on the distal end side of the detector 30 has been described. Alternatively, the wind speed sensor 50 may be disposed in any place of the detector 30 other than the distal end side.

In the above first and second embodiments, the example in which the first direction that is the axial direction of the outer rotating shafts 22a and 22b is horizontal has been described. However, without being limited to the above configuration, the first direction may be set to a direction other than the horizontal direction.

Meanwhile, the present disclosure is not limited to the above-mentioned first and second embodiments, and may be appropriately modified. In the above-described first and second embodiments, it is needless to mention that an element including the embodiments is not necessarily an essential element excluding a case where it is clearly stated to be particularly essential and a case where it is considered to be obviously essential based on the principle. In the above-described first and second embodiments, when a numerical value of the number, the numerical value, the quantity, the range, and the like of a configuration element of the embodiment are mentioned, the numerical value is not limited to the specified number excluding a case where it is clearly stated to be particularly essential and a case where it is obviously limited to the specified number based on the principle.

The invention claimed is:

1. A measurement device comprising:
a frame member which is an annular shaped inner frame;
a support member which is an annular shaped outer frame, the frame member being disposed inside of the support member and being supported by the support member to be rotatable about a first axis line extending in a first direction;

a detector including
a detection body disposed inside of the frame member and supported to be rotatable relative to the frame member about a second axis line extending in a second direction orthogonal to the first direction, and
a vane disposed on one end side of the detection body in a direction orthogonal to the second axis line, the vane receiving an air flow to rotate the frame member and the detection body, thereby directing an other end side of the detection body in the direction orthogonal to the second axis line toward an air flow upstream side;

a wind direction sensor disposed in the detection body, the wind direction sensor detecting a wind direction as a direction toward which the other end side of the detection body in the direction orthogonal to the second axis line faces; and a wind speed sensor disposed in the detection body, the wind speed sensor detecting a wind speed of the air flow.

2. The measurement device according to claim 1, wherein the wind speed sensor is disposed on the other end side of the detection body in the direction orthogonal to the second axis line.

3. The measurement device according to claim 1, wherein the wind direction sensor includes a sensor element that detects an angular velocity of the frame member about the first axis line and an angular velocity of the detection body about the second axis line.

4. The measurement device according to claim 3, wherein the wind direction sensor includes a calculation circuit that
integrates the angular velocity of the frame member detected by the sensor element over time to calculate a rotation angle of the frame member,
integrates the angular velocity of the detection body detected by the sensor element over time to calculate the rotation angle of the detection body, and
obtains the wind direction according to the calculated rotation angle of the frame member and the calculated rotation angle of the detection body.

5. The measurement device according to claim 1, further comprising:
a first rotating shaft disposed on one of the detection body and the frame member, the first rotating shaft being formed to extend in the second direction and rotatably supporting the detection body;
a first bearing disposed on the other of the detection body and the frame member, the first bearing rotatably supporting the first rotating shaft;
a second rotating shaft disposed on one of the frame member and the support member, the second rotating shaft being formed to extend in the first direction and rotatably supporting the frame member; and
a second bearing disposed on the other of the frame member and the support member, the second bearing rotatably supporting the second rotating shaft.

6. The measurement device according to claim 5, further comprising:
a first electrode portion;
a second electrode portion;
a third electrode portion; and
a fourth electrode portion, wherein a wire for propagating an output signal of the wind direction sensor and an output signal of the wind speed sensor from the detection body side to the support member side is disposed in the first rotating shaft, the first bearing, the frame member, the second rotating shaft, the second bearing, and the support member, the first electrode portion is connected to a portion of the wire which is disposed in the first rotating shaft, the first electrode portion being formed on an outer surface of the first rotating shaft, the second electrode portion is disposed in the first bearing and is connected to a portion of the wire which is disposed in the first bearing, the second electrode portion sliding on the first electrode portion along with the rotation of the first rotating shaft;

the third electrode portion is connected to a portion of the wire which is disposed in the second rotating shaft, the third electrode portion being formed on an outer surface of the second rotating shaft; and the fourth electrode portion is disposed in the second bearing and is connected to a portion of the wire which is disposed in the second bearing, the fourth electrode portion sliding on the third electrode portion along with the rotation of the second rotating shaft.

7. The measurement device according to claim 5, wherein
each of the first rotating shaft and the second rotating shaft includes a needle portion having a cross-section orthogonal to an axial direction of the needle portion which reduces in area from one end side of the axial direction toward the other end side in the axial direction,
each of the first bearing and the second bearing includes a hole portion that houses the needle portion, the other end side of the needle portion in the axial direction being located on a bottom part side of the hole portion, and
the hole portion has an opening area that reduces in size from an opening portion side toward the bottom part side, the hole portion rotatably supporting the needle portion.

8. A measurement system comprising:
a measurement device according to claim 1; and
a display control device that displays the wind direction detected by the wind direction sensor and the wind speed detected by the wind speed sensor based on the output signal from the wind direction sensor and the output signal from the wind speed sensor in the measurement device.

9. The measurement system according to claim 8, further comprising:
an amplifier that amplifies the output signal from the wind direction sensor and the output signal from the wind speed sensor in the measurement device, wherein
the display control device displays the wind direction and the wind speed based on the output signal from the wind direction sensor and the output signal from the wind speed sensor, which are amplified by the amplifier.

10. The measurement device according to claim 1, further comprising:
a first wiring portion that connects the wind direction sensor to a first terminal of the support member; and
a second wiring portion that connects the wind speed sensor to a second terminal of the support member, wherein
the first wiring portion and the second wiring portion are disposed along opposite sections of the frame member as to each other with respect to an axial center of the frame member, and along opposite sections of the support member as to each other with respect to an axial center of the support member.

11. The measurement device according to claim 10, wherein:
the first wiring portion is embedded in a first inner rotating shaft, a first inner bearing, the frame member, a first outer rotating shaft, a first outer bearing, the support member and a first protrusion.

12. The measurement device according to claim 10, wherein:
the second wiring portion is embedded in a second inner rotating shaft, a second inner bearing, the frame member, a second outer rotating shaft, a second outer bearing, the support member and a second protrusion.

* * * * *